United States Patent
Stasiak et al.

(10) Patent No.: US 11,613,075 B2
(45) Date of Patent: Mar. 28, 2023

(54) BUILD COMPOSITIONS

(71) Applicant: HEWLETT-PACKARD DEVELOPMENT COMPANY, L.P., Houston, TX (US)

(72) Inventors: James William Stasiak, Corvallis, OR (US); Garry Hinch, Corvallis, OR (US)

(73) Assignee: Hewlett-Packard Development Company, L.P., Spring, TX (US)

(*) Notice: Subject to any disclaimer, the term of this patent is extended or adjusted under 35 U.S.C. 154(b) by 1107 days.

(21) Appl. No.: 16/080,256

(22) PCT Filed: Apr. 20, 2017

(86) PCT No.: PCT/US2017/028556
§ 371 (c)(1),
(2) Date: Aug. 27, 2018

(87) PCT Pub. No.: WO2018/194609
PCT Pub. Date: Oct. 25, 2018

(65) Prior Publication Data
US 2021/0187836 A1    Jun. 24, 2021

(51) Int. Cl.
*B29C 64/165* (2017.01)
*B29C 64/393* (2017.01)
(Continued)

(52) U.S. Cl.
CPC ........ *B29C 64/165* (2017.08); *B29C 64/393* (2017.08); *B33Y 40/10* (2020.01);
(Continued)

(58) Field of Classification Search
CPC ..... B29C 64/165; B29C 64/393; B33Y 40/00; B33Y 70/10; B33Y 70/00; G01N 21/31; B29K 2995/0018
See application file for complete search history.

(56) References Cited

U.S. PATENT DOCUMENTS 6,632,526 B1    10/2003  Chandler et al.
7,394,997 B2     7/2008  Mei et al.
(Continued)

FOREIGN PATENT DOCUMENTS

WO    2016042025 A1    3/2016
WO    2017188961 A1   11/2017
(Continued)

OTHER PUBLICATIONS

Guan et al., "The Novel Approach to Enhance Seed Security: Dual Anti-Counterfeiting Methods Applied on Tobacco Pelleted Seeds", PLOS One, vol. 8, Issue No. 2, Retrieved from internet—https://journals.plos.org/plosone/article?id=10.1371/journal.pone.0057274, Feb. 2013, 9 Pages.
(Continued)

*Primary Examiner* — Nahida Sultana
(74) *Attorney, Agent, or Firm* — HP Inc. Patent Department (57) ABSTRACT

The present disclosure relates to a build composition for a 3-dimensional printing process. The build composition comprises thermoplastic polymer particles, a first photoluminescent agent and a second photoluminescent agent. The build composition has a spectral signature characteristic of the presence of the first photoluminescent agent and the second photoluminescent agent in combination.

17 Claims, 8 Drawing Sheets

(51) Int. Cl.
    *B33Y 70/10*     (2020.01)
    *G01N 21/31*     (2006.01)
    *B33Y 70/00*     (2020.01)
    *B33Y 40/10*     (2020.01)

(52) U.S. Cl.
    CPC ............... *B33Y 70/00* (2014.12); *B33Y 70/10* (2020.01); *G01N 21/31* (2013.01); *B29K 2995/0018* (2013.01)

(56) References Cited

U.S. PATENT DOCUMENTS

| | | |
|---|---|---|
| 7,713,590 B2 | 5/2010 | Landry et al. |
| 7,972,426 B2 | 7/2011 | Hinch et al. |
| 9,313,360 B2 | 4/2016 | Morovic et al. |
| 2003/0157725 A1 | 8/2003 | Franzen et al. |
| 2007/0012783 A1 | 1/2007 | Mercolino |
| 2007/0238056 A1 | 10/2007 | Baumann et al. |
| 2007/0262714 A1* | 11/2007 | Bylsma ............... G01J 3/10 313/512 |
| 2008/0053638 A1* | 3/2008 | Appleby ............... B29C 33/42 164/129 |
| 2008/0121818 A1 | 5/2008 | Agrawal et al. |
| 2010/0043880 A1* | 2/2010 | Bhaumik ............. C08K 5/3437 136/257 |
| 2010/0142310 A1* | 6/2010 | Uphus .................. B29B 7/603 366/132 |
| 2011/0200971 A1* | 8/2011 | Kalgutkar ............... A61K 6/20 433/201.1 |
| 2012/0161431 A1* | 6/2012 | Vulpius ................. B29C 55/065 156/196 |
| 2013/0270457 A1 | 10/2013 | Boday et al. |
| 2014/0218803 A1* | 8/2014 | Labrot ................. B29C 48/793 264/21 |
| 2018/0050501 A1* | 2/2018 | Talyansky ............. B29C 64/118 |
| 2019/0081219 A1* | 3/2019 | Chen ..................... H01L 33/504 |
| 2021/0179878 A1* | 6/2021 | Stasiak ................. B29C 64/112 |
| 2021/0229344 A1* | 7/2021 | Okamoto .............. B29C 64/264 |
| 2022/0203617 A1* | 6/2022 | Pekic ..................... B29C 64/40 |

FOREIGN PATENT DOCUMENTS

| | | |
|---|---|---|
| WO | 2017188963 A1 | 11/2017 |
| WO | 2018022051 A1 | 2/2018 |

OTHER PUBLICATIONS

Tain et al., "Screening Fluorescent Dyes for Anti-Counterfeit Labelling in Rape Seed (*Brassica* Napus)", Seed Science and Technology, vol. 40, Issue No. 3, Abstract, Retrieved from internet—http://www.ingentaconnect.com/content/ista/sst/2012/00000040/00000003/art00010, 2012, 1 Page.

* cited by examiner

BUILD COMPOSITIONS

BACKGROUND 3-dimensional (3D) printing or additive manufacturing refers to a printing process in which successive layers of material are formed under computer control to create an object. Various methods of 3D printing have been developed, including heat-assisted extrusion, selective laser sintering (SLS), fused deposition modeling (FDM), high speed sintering (HSS) and photolithography.

BRIEF DESCRIPTION OF THE DRAWINGS

Various features will be described, by way of example only, with reference to the following figures, in which.

DETAILED DESCRIPTION

It is to be understood that this disclosure is not limited to the particular process steps and materials disclosed herein because such process steps and materials may vary. It is also to be understood that the terminology used in this disclosure is used for the purpose of describing particular examples only. The terms are not intended to be limiting because the scope of the present disclosure is intended to be limited only by the appended claims and equivalents thereof.

It is noted that, as used in this specification and the appended claims, the singular forms "a," "an," and "the" include plural forms unless the context dearly dictates otherwise.

As used herein, "liquid vehicle" or "ink vehicle" refers to a liquid in which additive is placed to form an inkjet composition. A wide variety of liquid vehicles may be used with the systems and methods of the present disclosure. A variety of different agents, including surfactants, solvents, co-solvents, anti-kogation agents, buffers, biocides, sequestering agents, viscosity modifiers, and surface-active agents may be dispersed or dissolved in the liquid vehicle.

The term "fusing agent" is used herein to describe agents that may be applied to particulate build material, and which may assist in fusing the build material to form a layer of a 3D part. Heat may be used to fuse the build material, but the fusing agent can also assist in binding powder together, and/or in generating heat from electromagnetic energy. For example, a fusing composition may include a fusing agent that can bind the build material together in preparation for heating to fuse the materials together, or may be an additive that becomes energized or heated when exposed to a frequency or frequencies of electromagnetic radiation. Any additive that assists in fusing particulate build material to form the 3D printed part can be used.

As used herein, "jet," "jettable," "jetting," or the like refers to compositions that are ejected from jetting architecture, such as inkjet architecture. Inkjet architecture can include thermal or piezo drop on demand architecture, as well as continuous inkjet architecture. Additionally, such architecture can be configured to print varying drop sizes, for example, less than 50 picolitres (pl), less than 40 pl, less than 30 pl, less than 20 pl, less than 10 pl. In some examples, the drop size may be 1 to 40 pl, for example, 3 or 5 to 30 picolitres.

As used herein, the term "substantial" or "substantially" when used in reference to a quantity or amount of a material, or a specific characteristic thereof, refers to an amount that is sufficient to provide an effect that the material or characteristic was intended to provide. The exact degree of deviation allowable may in some cases depend on the specific context.

As used herein, the term "about" is used to provide flexibility to a numerical range endpoint by providing that a given value may be "a little above" or "a little below" the endpoint. The degree of flexibility of this term can be dictated by the particular variable and determined based on the associated description herein.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include individual numerical values or sub-ranges encompassed within that range as if each numerical value and sub-range is explicitly recited. As an illustration, a numerical range of "about 1 wt % to about 5 wt %" should be interpreted to include not only the explicitly recited values of about 1 wt % to about 5 wt %, but also include individual values and sub-ranges within the indicated range. Thus, included in this numerical range are individual values such as 2, 3.5, and 4 and sub-ranges such as from 1-3, from 2-4, and from 3-5, etc. This same principle applies to ranges reciting only one numerical value. Furthermore, such an interpretation should apply regardless of the breadth of the range or the characteristics being described.

The present disclosure relates to a build composition for a 3-dimensional printing process. The build composition comprises thermoplastic polymer particles, a first photoluminescent agent and a second photoluminescent agent. The build composition has a spectral signature characteristic of the presence of the first photoluminescent agent and the second photoluminescent agent in combination.

The present disclosure also relates to a 3-D printed part comprising a thermoplastic polymer composition comprising a first photoluminescent agent and a second photoluminescent agent, wherein the composition has a spectral signature characteristic of the presence of the first photoluminescent agent and second photoluminescent agent in combination.

In another aspect, the present disclosure provides 3-dimensional print material set comprising a build composition and an inkjet fusing composition. The build composition comprises thermoplastic polymer particles, a first photoluminescent agent and a second photoluminescent agent. The build composition has a spectral signature characteristic of the presence of the first photoluminescent agent and the second photoluminescent agent in combination. The inkjet fusing composition comprises a fusing agent capable of absorbing electromagnetic radiation to produce heat.

In yet another aspect, the present disclosure provides a method of analysing a composition comprising a thermoplastic polymer for a spectral signature. The method comprises subjecting the composition to spectroscopic analysis to obtain an absorption or emission spectrum, optionally resolving the spectrum obtained by removing at least some peaks attributable to the thermoplastic polymer from the spectrum to produce a resolved spectrum, and comparing the spectrum or resolved spectrum obtained with a reference spectrum indicative of a spectral signature that is characteristic of the presence of a first photoluminescent agent and a second photoluminescent agent in combination.

In some examples, the composition is subjected to emission spectroscopy.

By incorporating a first photoluminescent agent and a second photoluminescent agent into the build composition, the build composition can be provided with a spectral signature or fingerprint characteristic of the presence of the photoluminescent agent and second photoluminescent agent in combination. This spectral signature may also be detectable in 3-D parts printed using the build composition. This spectral signature can be used as a security feature to allow a company's proprietary build composition to be distinguished from build compositions from a different (e.g. unauthorized) source.

In some examples, the spectra of the first and second photoluminescent agents may overlap to provide a combined spectrum that may be difficult to replicate without prior knowledge of the nature of the individual photoluminescent agents and their relative amounts. Accordingly, the spectral signature may help to deter counterfeiters. On the other hand, with knowledge of the individual agents and their relative amounts, samples of build material can be analyzed for their authenticity by spectroscopic techniques. Furthermore, by using a blend of at least two photoluminescent agents, the spectral signature can be tuned by varying the nature and altering the relative amounts of the photoluminescent agents. The nature of the individual photoluminescent agents may determine the position of the peaks in the emission spectrum, while their relative amounts may determine the relative heights of the peaks. The total amount of photoluminescent agent in the sample may also be varied to vary the intensity of the photoluminescence on exposure to electromagnetic radiation. Thus, in some examples, different spectral signatures can be designed and applied to different e.g. types of build material, for example, to designate a product line.

Photoluminescent Agents

Any suitable photoluminescent agent may be employed in the build composition. "Photoluminescence," as used herein, refers to an emission of light by a substance as a result of the absorbance of a photon by that substance. More specifically, absorption of a photon by a photoluminescent agent can induce photoexcitation of the photoluminescent agent. Photoexcitation refers to the excitation of electrons within the photoluminescent agent due to the absorption of the photon. The photoexcitation of the photoluminescent agent can be followed by a relaxation event, where the excited electrons relax back to a lower energy state. The relaxation of the excited electrons can be accompanied by the emission of a photon from the photoluminescent agent. In some examples, the photoluminescent agent may absorb photons at a different wavelength of electromagnetic radiation than the wavelength of the emitted photon. In some examples, there may be a "down conversion", where light of a particular is absorbed by a photoluminescent agent resulting in a Stokes shift, which causes light to be emitted at a longer wavelength than the light that is absorbed. For example, in a down conversion process, UV light may be absorbed by a photoluminescent agent resulting in a Stokes shift, which creates visible light emission (e.g. approximately between 400 to 700 nm). Conversely, an "up conversion" may occur, where the emitted light has a shorter wavelength than the light that is absorbed. For example, in an up conversion, a photoluminescent agent may be excited by infer red light and the emission may up-convert into the visible spectrum.

In some examples, the photoluminescent agents can be "tuned" to photoexcite at wavelengths within the non-visible range and to photoluminesce within the visible range. The photoluminescent agents may be excited at wavelengths that are longer or shorter than wavelengths in the visible range. In some examples, the photoluminescent agents can be "tuned" to photoexcite at wavelengths within the Ultraviolet (UV) range and to photoluminesce within the visible range. This can allow the photoluminescent agent to remain covert until irradiated with a photoexciting wavelength of electromagnetic radiation. In other examples, the photoluminescent agent can be "tuned" to photoexcite at one wavelength within the visible range and to emit at a different wavelength within the visible range. In yet other examples, the photoluminescent agents can be "tuned" to photoexcite at wavelengths within the Infrared (IR) range and to photoluminesce within the visible range.

In some examples, the first photoluminescent agent and/or the second photoluminescent agent are UV-absorbing fluorescent pigments. Thus, the photoluminescent agents may be substantially undetectable in the build composition or 3-D printed part under visible light. However, on exposure to UV radiation, the photoluminescent agents may fluoresce. As mentioned above, the fluorescence spectrum may be characteristic of at least the presence of the first photoluminescent agent and the second photoluminescent agent in combination. This may provide a spectral signature, which may be detectable on exposure to UV light In some examples, the emission spectrum of the first photoluminescent agent overlaps with the emission spectrum of the second photoluminescent agent at least at a wavelength of 400 to 700 nm. In some examples, the first photoluminescent agent and/or the second photoluminescent agent absorbs electromagnetic radiation at a wavelength less than 400 nm to generate a photoluminescent emission at least at a wavelength of from 400 to 700 nm.

In some examples, the photoluminescent agents may also phosphoresce for a period of time after exposure to UV light. This phosphorescence may also contribute to the spectral signature with a characteristic temporal persistence and decay rate.

In some examples, the photoluminescent agents may take the form of solid particles or powder. The particles may be dispersed in the thermoplastic polymer particles of the build material. The particles may have a particle size of 10 to 100 µm, for example, 20 to 80 µm.

In some examples, the total amount of photoluminescent agent in the build material composition may be 0.01 to 10 weight % based on the total weight of the composition. In some examples, the total amount may be 0.05 to 7 weight %, for example, 0.1 to 5 weight % or 0.1 to 3 weight % based on the total weight of the composition.

In some examples, the weight ratio of the first photoluminescent agent to the second photoluminescent agent is 50:1 to 1:50, for example, 20:1 to 1:20. In some examples, the weight ratio of the first photoluminescent agent to the second photoluminescent agent is 15:1 to 1:15, for example, 10:1 to 1:10 or 5:1 to 1:5.

Non-limiting examples of photoluminescent agents can include a photoluminescent pigment, a photoluminescent dye, a quantum dot, the like, or combinations thereof. In some examples, the photoluminescent agent can include a fluorescent agent, a phosphorescent agent, or a combination thereof. In some examples, photoluminescent dyes can be enclosed within, distributed throughout, or otherwise associated with a particle (e.g. nanoparticle). In some examples, photoluminescent pigments can include a photoluminescent particle (e.g. nanoparticle). For example, a photoluminescent pigment or dye can be coupled to a surface of a particle (e.g. nanoparticle), embedded within the particle (e.g. nanoparticle), distributed throughout the particle (e.g. nanoparticle), or otherwise associated with a particle (e.g. nanoparticle).

Numerous photoluminescent pigments and/or dyes can be used. Non-limiting examples can include europium (rare earth) complexes, europium doped strontium aluminates, thallium doped sodium iodides, activated alkaline earth metal sulfides, activated alkaline earth metal silicates, rhodamines, oxazinones (e.g. benzoxazinones), acridines, fluorines, cyanines, oxazines, phenanthridines, pyrrolopyrroles, benzoxazoles, benzothiazoles, azo pigments, azo-metal complexes, bisacetoacetarylides, azomethines, arylmethines, benzimidazolones, diazopyrazolones, quinacridones, quinones, flavanthrones, perinones, isoindolines, isoindolinones, perylenes, phthalocyanines, metal-phthalocyanine complexes, porphyrins, metal-porphyrin complexes, polyenes, polymethines, squaraines, organometallics, bisphenyl substituted ureas or combinations thereof. In one specific example, a photoluminescent dye can be fluorescein. In another specific example, a photoluminescent dye can be rhodamine B. As previously described, dyes or pigments can be associated with nanoparticles. Non-limiting commercially available examples can include Fluoresbrite® microspheres, such as YG Carboxylate Microspheres, YO Carboxylate Microspheres, NYO Carboxylate Microspheres, BB Carboxylate Microspheres, and EU Carboxylate Microspheres available from Polysciences, Inc.

Quantum dots can also be used as a photoluminescent agent. Quantum dots can be very small semiconductor particles that may have a particle size of about 20 nm or less. Quantum dots can be made of a variety of semiconductor materials. For example, quantum dots can be made of a single element, such as silicon, germanium, and the like. Alternatively, quantum dots can be compounds of materials, such as indium phosphide, indium arsenide, zinc sulfide, lead sulfide, cadmium sulfide, lead selenide, cadmium selenide, the like, or combinations thereof. Other quantum dots that can be used include I-III-VI quantum dots, including, for example $CuInS_x$ or $CuInSe_x$ quantum dots, where x may be 1 or 2. Non-limiting commercially available quantum dots can include Indium Phosphide Zinc Sulfide Quantum Dots in Water and Cadmium Selenide Zinc Sulfide Quantum Dots in Water from NN-Labs, and NanoDOT™ CIS-500 and NanoDOT™ CIS-700 from Voxtel, Inc.

Quantum dots can be prepared In a number of ways. For example, the quantum dots can be made of a single component with uniform composition throughout (e.g., silicone, zinc sulfide, etc.). For given material compositions, the photoluminescence of these quantum dots can be tunable merely by adjusting the size of the quantum dot. In other examples, the quantum dots can be prepared with a core material having a lower band gap surrounded by a shell material having a higher band gap. As one example, the core material can be cadmium selenide and the shell material can be zinc sulfide. The photoluminescence of these quantum dots can be tunable based on both particle size and the specific combination of core and/or shell materials. In other examples, the quantum dots can be prepared by alloying different quantum dots particles together, such as indium phosphide and zinc sulfide, or cadmium selenide and zinc sulfide, or any other suitable alloy of quantum dot particles. These quantum dots can also be tuned based on both size and the specific semiconductor band gap used.

As previously described, quantum dots can have a particle size of about 20 nm or less. Generally, the larger the particle size of the quantum dot, the longer the photoluminescent emission wavelength will be. Conversely, the smaller the particle size of the quantum dot, the shorter the photoluminescent emission wavelength will be. In some examples, the quantum dots can have a particle size from about 2 nm to about 10 nm. In other examples, the quantum dots can have a particle size from about 4 nm to about 8 nm. In other examples, the quantum dots can have a particle size from about 8 nm to about 14 nm.

Build Material

Any suitable build material may be employed in the present disclosure. The build material comprises polymer particles or powder, for example, thermoplastic polymer particles or powder. The particles may have an average particle size from 10 to 100 μm, for example, 20 to 80 μm. As used in the present disclosure, "average" with respect to properties of particles refers to a number average unless otherwise specified. Accordingly, "average particle size" refers to a number average particle size. Additionally, "particle size" refers to the diameter of spherical particles, or to the longest dimension of non-spherical particles. Particle size may be determined by, for example, dynamic laser scattering or laser diffraction spectroscopy. An example of a commercially available instrument suitable for determining particle size may be Mastersizer® by Malvern® Instruments.

In certain examples, the polymer particles can have a variety of shapes, such as substantially spherical particles or irregularly-shaped particles. In some examples, the polymer particles can be capable of being formed into 3D printed parts with a resolution of 10 to 100 μm, for example 20 to 80 μm. As used herein, "resolution" refers to the size of the smallest feature that can be formed on a 3D printed part. The polymer particles can form layers from about 10 to about 100 μm thick, allowing the fused layers of the printed part to have roughly the same thickness. This can provide a resolution in the z-axis direction of about 10 to about 100 μm. The polymer particles can also have a sufficiently small particle size and sufficiently regular particle shape to provide about 10 to 100 μm resolution along the x-axis and y-axis.

In some examples, the polymer particles can be colorless. For example, the polymer powder can have a white, translucent, or transparent appearance. When used, for example, with a colorless fusing composition, such polymer particles can provide a printed part that is white, translucent, or transparent. In other examples, the polymer particles can be colored for producing colored parts. In still other examples, when the polymer powder is white, translucent, or transparent, color can be imparted to the part by the fusing ink or another colored ink.

The polymer particles can have a melting or softening point from about 70° C. to about 350° C. In further examples, the polymer can have a melting or softening point from about 150° C. to about 200° C. A variety of thermoplastic polymers with melting points or softening points in these ranges can be used. For example, the polymer powder can nylon 6 powder, nylon 9 powder, nylon 11 powder, nylon 12 powder, nylon 66 powder, nylon 612 powder, polyethylene powder, thermoplastic polyurethane powder, polypropylene powder, polyester powder, polycarbonate powder, polyether ketone powder, polyacrylate powder, polystyrene powder, or combinations thereof. In a specific example, the polymer powder can be nylon 12, which can have a melting point from about 175° C. to about 200° C. In another specific example, the polymer powder can be thermoplastic polyurethane.

The polymer particles can also in some cases be blended with a filler. The filler can include inorganic particles such as alumina, silica, or combinations thereof. When the particles fuse together, the filler particles can become embedded in the polymer, forming a composite material. In some examples, the filler can include a free-flow agent, anti-caking agent, or the like. Such agents can prevent packing of the powder particles, coat the powder particles and smooth edges to reduce inter-particle friction, and/or absorb moisture. In some examples, a weight ratio of thermoplastic polymer powder to filler particles can be from 10:1 to 1:2 or from 5:1 to 1:1.

Fusing Composition

In some examples, the build composition may be provided in combination with a fusing composition. In a 3-D printing method, a fusing composition may be applied to selected areas of a layer of build material to facilitate fusing of the build material at the selected areas. A further layer of build material is then applied and the process repeated to build a 3-D printed part.

Where a fusing composition is employed, the fusing composition (or "fusing ink") can contain a fusing agent that is capable of absorbing electromagnetic radiation to produce heat. The fusing agent can be colored or colorless. In some examples, the fusing agent can be carbon black, near-infrared absorbing dyes, near-infrared absorbing pigments, tungsten bronzes, molybdenum bronzes, metal nanoparticles, or combinations thereof.

Examples of near-infrared absorbing dyes include tetraaryldiamine dyes, cyanine dyes, pthalocyanine dyes, dithiolene dyes, and others. In further examples, the fusing agent can be a near-infrared absorbing conjugated polymer such as poly(3,4-ethylenedioxythiophene)-poly(styrenesulfonate) (PEDOT:PSS), a polythiophene, poly(p-phenylene sulfide), a polyaniline, a poly(pyrrole), a poly(acetylene), poly(p-phenylene vinylene), polyparaphenylene, or combinations thereof. As used herein, "conjugated" refers to alternating double and single bonds between atoms in a molecule. Thus, "conjugated polymer" refers to a polymer that has a backbone with alternating double and single bonds. In many cases, the fusing agent can have a peak absorption wavelength in the range of 800 nm to 1400 nm.

A variety of near-infrared pigments can also be used. Non-limiting examples can include phosphates having a variety of counterions such as copper, zinc, iron, magnesium, calcium, strontium, the like, and combinations thereof. Non-limiting specific examples of phosphates can include $M_2P_2O_7$, $M_4P_2O_9$, $M_5P_2O_{10}$, $M_3(PO_4)_2$, $M(PO_3)_2$, $M_2P_4O_{12}$, and combinations thereof, where M represents a counterion having an oxidation state of +2, such as those listed above or a combination thereof. For example, $M_2P_2O_7$ can include compounds such as $Cu_2P_2O_7$, $Cu/MgP_2O_7$, $Cu/ZnP_2O_7$, or any other suitable combination of counterions. It is noted that the phosphates described herein are not limited to counterions having a +2 oxidation state. Other phosphate counterions can also be used to prepare other suitable near-infrared pigments.

Additional near-infrared pigments can include silicates. The silicates can have the same or similar counterions as the phosphates. One non-limiting example can include $M_2SiO_4$, $M_2Si_2O_6$, and other silicates where M is a counterion having an oxidation state of +2. For example, the silicate $M_2Si_2O_8$ can include $Mg_2Si_2O_6$, $Mg/CaSi_2O_6$, $MgCuSi_2O_6$, $Cu_2Si_2O_6$, $Cu/ZnSi_2O_6$, or other suitable combination of counterions. It is noted that the silicates described herein are not limited to counterions having a +2 oxidation state. Other silicate counterions can also be used to prepare other suitable near-infrared pigments.

The amount of fusing agent in the fusing composition can vary depending on the type of fusing agent. In some examples, the concentration of fusing agent in the fusing composition can be from 0.1 wt % to 20 wt %. In one example, the concentration of fusing agent in the fusing ink can be from 0.1 wt % to 15 wt %. In another example, the concentration can be from 0.1 wt % to 8 wt %. In yet another example, the concentration can be from 0.5 wt % to 2 wt %. In a particular example, the concentration can be from 0.5 wt % to 1.2 wt %.

In some examples, the fusing ink can have a black or gray color due to the use of carbon black as the fusing agent. However, in other examples the fusing ink can be colorless or nearly colorless. The concentration of the fusing agent can be adjusted to provide a fusing ink in which the visible color of the fusing ink is not substantially altered by the fusing agent. Although some of the above described fusing agents can have low absorbance in the visible light range, the absorbance is usually greater than zero. Therefore, the fusing agents can absorb some visible light, but their color in the visible spectrum can be minimal enough that it does not substantially impact the fusing composition's ability to take on another color when a colorant is added (unlike carbon black which dominates the ink's color with gray or black tones). The fusing agents in concentrated form can have a visible color, but the concentration of the fusing agents in the fusing ink can be adjusted so that the fusing agents may not be present in such high amounts that they alter the visible color of the fusing ink. For example, a fusing agent with a very low absorbance of visible light wavelengths can be included in greater concentrations compared to a fusing agent with a relatively higher absorbance of visible light. These concentrations can be adjusted based on a specific application with some experimentation.

In further examples, the concentration of the fusing agent can be high enough that the fusing agent impacts the color of the fusing ink, but low enough that when the ink is printed on the build material comprising the polymer particles or powder, the fusing agent does not impact the color of the powder. The concentration of the fusing agent can be balanced with the amount of fusing ink to be printed on the polymer powder so that the total amount of fusing agent printed onto the polymer powder can be low enough that the visible color of the polymer powder is not impacted. In one example, the fusing agent can have a concentration in the fusing ink such that after the fusing ink is printed onto the polymer powder, the amount of fusing agent in the polymer powder is from 0.0003 wt % to 5 wt % with respect to the weight of the polymer powder.

The fusing agent can have a temperature boosting capacity sufficient to increase the temperature of the polymer powder above the melting or softening point of the polymer powder. As used herein, "temperature boosting capacity" refers to the ability of a fusing agent to convert near-infrared light energy into thermal energy to increase the temperature of the printed polymer powder over and above the temperature of the unprinted portion of the polymer powder. The polymer powder particles can be fused together when the temperature increases to the melting or softening temperature of the polymer. As used herein, "melting point" refers to the temperature at which a polymer transitions from a crystalline phase to a pliable, amorphous phase. Some polymers do not have a single melting point, but rather have a range of temperatures over which the polymers soften. This range can be segregated into a lower softening range, a middle softening range, and an upper softening range. In the lower and middle softening ranges, the particles can coalesce to form a part while the remaining polymer powder remains loose. If the upper softening range is used, the whole powder bed can become a cake. The "softening point," as used herein, refers to the temperature at which the polymer particles coalesce while the remaining powder remains separate and loose. When the fusing ink is printed on a portion of the polymer powder, the fusing agent can heat the printed portion to a temperature at or above the melting or softening point, while the unprinted portions of the polymer powder remain below the melting or softening point. This allows the formation of a solid 3D printed part, while the loose powder can be easily separated from the finished printed part.

Although melting point and softening point are often described herein as the temperatures for coalescing the polymer powder, in some cases the polymer particles can coalesce together at temperatures slightly below the melting point or softening point. Therefore, as used herein "melting point" and "softening point" can include temperatures slightly lower, such as up to about 20° C. lower, than the actual melting point or softening point.

In one example, the fusing agent can have a temperature boosting capacity from about 10° C. to about 70° C. for a polymer with a melting or softening point from about 100° C. to about 350° C. If the powder bed is at a temperature within about 10° C. to about 70° C. of the melting or softening point, then such a fusing agent can boost the temperature of the printed powder up to the melting or softening point, while the unprinted powder remains at a lower temperature. In some examples, the powder bed can be preheated to a temperature from about 10° C. to about 70° C. lower than the melting or softening point of the polymer. The fusing composition can then be printed onto the powder and the powder bed can be irradiated with a near-infrared light to coalesce the printed portion of the powder.

The fusing composition may comprise a liquid vehicle. The fusing agent may be dispersed in the liquid vehicle. In some examples, the liquid vehicle formulation can include water or consist of water.

In some examples, an additional co-solvent may also be present. In certain examples, a high boiling point co-solvent can be included in the fusing composition. The high boiling point co-solvent can be an organic co-solvent that boils at a temperature higher than the temperature of the powder bed during printing. In some examples, the high boiling point co-solvent can have a boiling point above 250° C. In still further examples, the high boiling point co-solvent can be present at a concentration from about 1 wt % to about 4 wt %.

Classes of co-solvents that can be used can include organic co-solvents including aliphatic alcohols, aromatic alcohols, diols, glycol ethers, polyglycol ethers, caprolactams, formamides, acetamides, and long chain alcohols. Examples of such compounds include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs ($C_6$-$C_{12}$) of polyethylene glycol alkyl ethers, N-alkyl caprolactams, unsubstituted caprolactams, both substituted and unsubstituted formamides, both substituted and unsubstituted acetamides, and the like. Specific examples of solvents that can be used include, but are not limited to, 2-pyrrolidinone, N-methylpyrrolidone, 2-hydroxyethyl-2-pyrrolidone, 2-methyl-1,3-propanediol, tetraethylene glycol, 1,6-hexanediol, 1,5-hexanediol and 1,5-pentanediol.

A surfactant, or combination of surfactants, can also be present in the fusing composition. Examples of surfactants include alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amines, protonated polyethylene oxide amides, dimethicone copolyols, substituted amine oxides, and the like. The amount of surfactant added to the formulation of this disclosure may range from 0.01 wt % to 20 wt %. Suitable surfactants can include, but are not limited to, liponic esters such as Tergitol™ 15-S-12, Tergitol™ 15-S-7 available from Dow Chemical Company, LEG-1 and LEG-7; Triton™ X-100; Triton™ X-405 available from Dow Chemical Company; and sodium dodecylsulfate.

Various other additives can be employed to optimize the properties of the fusing compositions for specific applications. Examples of these additives are those added to inhibit the growth of harmful microorganisms. These additives may be biocides, fungicides, and other microbial agents, which are routinely used in ink formulations. Examples of suitable microbial agents include, but are not limited to, NUOSEPT® (Nudex, Inc.), UCARCIDE™ (Union carbide Corp.), VANCIDE® (R.T. Vanderbilt Co.), PROXEL® (ICI America), and combinations thereof.

Sequestering agents, such as EDTA (ethylene diamine tetra acetic acid), may be included to eliminate the deleterious effects of heavy metal impurities. Buffers may also be used to control the pH of the composition. Viscosity modifiers may also be present. Such additives can be present at from 0.01 wt % to 20 wt %.

Colorant

In addition to fusing agent, colorant may be applied to the build material. Colorant may be applied to at least the outer surface of the printed part. The colorant may be visible to the naked eye and may be employed in sufficient amounts to impart a discernible colour to the printed part. The colorant may be a visible dye or a visible pigment.

Such colorants may be applied by printing an inkjet ink composition comprising a colorant onto the build material. The colored inkjet ink may be provided as part of the material set of the present disclosure. The colored inkjet ink may be applied to at least portions of a layer of unfused polymer particles to impart colour to the printed part. A colored inkjet ink can include any suitable colorant, including dyes and/or pigments. This can allow for printing of full-color 3-dimensional parts. Suitable inkjet inks include cyan, magenta, yellow, and black inks. Coloured inkjet ink compositions may be provided together with the build material, dopant composition and fusing composition as part of the 3-dimensional printing material set.

Alternatively or additionally, colorants may be incorporated into the fusing composition described above. In some examples, the colorant can be present in an amount from 0.5 wt % to 10 wt % in the compositions. In one example, the colorant can be present in an amount from 1 wt % to 5 wt %. In another example, the colorant can be present in an amount from 5 wt % to 10 wt %.

In some examples, the colorant can be a dye. The dye may be nonionic, cationic, anionic, or a mixture of nonionic, cationic, and/or anionic dyes. Specific examples of dyes that may be used include, but are not limited to, Sulforhodamine B, Acid Blue 113, Acid Blue 29, Acid Red 4, Rose Bengal, Acid Yellow 17, Acid Yellow 29, Acid Yellow 42, Acridine Yellow G, Acid Yellow 23, Acid Blue 9, Nitro Blue Tetrazolium Chloride Monohydrate or Nitro BT, Rhodamine 6G, Rhodamine 123, Rhodamine B, Rhodamine B Isocyanate, Safranine O, Azure B, and Azure B Eosinate, which are available from Sigma-Aldrich Chemical Company (St. Louis, Mo.). Examples of anionic, water-soluble dyes include, but are not limited to, Direct Yellow 132, Direct Blue 199, Magenta 377 (available from Ilford AG, Switzerland), alone or together with Acid Red 52. Examples of water-insoluble dyes include azo, xanthene, methine, polymethine, and anthraquinone dyes. Specific examples of water-insoluble dyes include Orasol® Blue GN, Orasol® Pink, and Orasol® Yellow dyes available from Ciba-Geigy Corp. Black dyes may include, but are not limited to, Direct Black 154, Direct Black 168, Fast Black 2, Direct Black 171, Direct Black 19, Acid Black 1, Acid Black 191, Mobay Black SP, and Acid Black 2.

In other examples, the colorant can be a (e.g. visible) pigment. The pigment can be self-dispersed with a polymer, oligomer, or small molecule; or can be dispersed with a separate dispersant. Suitable pigments include, but are not limited to, the following pigments available from BASF: Paliogen®) Orange, Heliogen® Blue L 6901F, Heliogen®) Blue NBD 7010, Heliogen® Blue K 7090, Heliogen® Blue L 7101F, Paliogen®) Blue L 6470, Heliogen®) Green K 8683, and Heliogen® Green L 9140. The following black pigments are available from Cabot: Monarch® 1400, Monarch® 1300, Monarch®) 1100, Monarch® 1000, Monarch®) 900, Monarch®880, Monarch® 800, and Monarch®) 700. The following pigments are available from CIBA: Chromophtal®) Yellow 3G, Chromophtal®) Yellow GR, Chromophta®) Yellow 8G, Igrazin® Yellow 5GT, Igralite® Rubine 4BL, Monastral® Magenta, Monastral Scarlet, Monastral Violet R, Monastral® Red B, and Monastral® Violet Maroon B. The following pigments are available from Degussa: Printex® U, Printex® V, Printex®140U, Printex® 140V, Color Black FW 200, Color Black FW 2, Color Black FW 2V, Color Black FW 1, Color Black FW 18, Color Black S 160, Color Black S 170, Special Black 6, Special Black 5, Special Black 4A, and Special Black 4. The following pigment is available from DuPont Tipure®) R-101. The following pigments are available from Heubach: Dalamar® Yellow YT-858-D and Heucophthal Blue G XBT-583D. The following pigments are available from Clariant: Permanent Yellow GR, Permanent Yellow G, Permanent Yellow DHG, Permanent Yellow NCG-71, Permanent Yellow GG, Hansa Yellow RA, Hansa Brilliant Yellow 5GX-02, Hansa Yellow-X, Novoperm® Yellow HR, Novoperm® Yellow FGL, Hansa Brilliant Yellow 10GX, Permanent Yellow G3R-01, Hostaperm® Yellow H4G, Hostaperm® Yellow H3G, Hostaperm Orange GR, Hostaperm® Scarlet GO, and Permanent Rubine FOB. The following pigments are available from Mobay: Quindoe Magenta, Indofast® Brilliant Scarlet, Quindo® Red R6700, Quindo® Red R6713, and Indofast® Violet. The following pigments are available from Sun Chemical: L74-1357 Yellow, L75-1331 Yellow, and L75-2577 Yellow. The following pigments are available from Columbian: Raven® 7000, Raven®5750, Raven®5250, Raven®5000, and Raven®3500. The following pigment is available from Sun Chemical: LHD9303 Black. Any other pigment and/or dye can be used that is useful in modifying the color of the above described inks and/or ultimately, the printed part.

Method of Analysis

As mentioned above, the present disclosure also relates to a method of analysing a composition comprising a thermoplastic polymer for a spectral signature. The method comprises subjecting the composition to spectroscopic analysis (e.g. absorption or emission spectroscopy) to obtain an absorption or emission spectrum, optionally resolving the spectrum obtained by removing at least some peaks attributable to the thermoplastic polymer from the spectrum to produce a resolved spectrum. The spectrum or resolved spectrum obtained is then compared with a reference spectrum indicative of a spectral signature that is characteristic of the presence of a first photoluminescent agent and a second photoluminescent agent in combination.

In some examples, the composition is subjected to emission spectroscopy to obtain an emission spectrum. This spectrum may be resolved by removing at least some emission peaks attributable to the thermoplastic polymer from the spectrum to produce a resolved emission spectrum. The emission spectrum or resolved emission spectrum obtained is then compared with a reference emission spectrum indicative of a spectral signature that is characteristic of the presence of a first photoluminescent agent and a second photoluminescent agent in combination.

In some examples, the reference spectrum may be the emission or absorption spectrum of an authentic build material or a 3-D printed part printed from an authentic build material. The emission or absorption spectrum may be an emission or absorption spectrum in a selected wavelength range. For example, the wavelength range may be 300 to 800 nm, for instance, 400 to 700 nm or 450 to 650 m. This reference spectrum may include peaks (e.g. emission peaks) derivable from the thermoplastic polymer particles of the build material and any other additives that may be present. The reference spectrum may be compared to the emission or absorption spectrum of the build material or 3-D printed part under analysis. The comparison may be made by visual inspection under UV light or by spectroscopic methods. A good match may demonstrate that the build material or 3-D printed part under analysis comes from an authentic source.

In some examples, the reference spectrum may be the emission spectrum of the first photoluminescent agent and the second photoluminescent agent in combination. The emission spectrum may be an emission spectrum in a selected wavelength range. For example, the wavelength range may be 300 to 800 nm, for instance, 400 to 700 nm or 450 to 650 nm. This emission spectrum may consist essentially of the combined emission spectra of the photoluminescent agents present in the authentic build material, for example, the combined emission spectra of the photoluminescent agents present in a selected wavelength range (e.g. 400 to 700 nm). The emission spectrum may be devoid of peaks from the thermoplastic polymer particles in the build composition and/or any other additives present.

Where the reference spectrum is the emission spectrum of the first photoluminescent agent and the second photoluminescent agent in combination, it may be necessary to resolve the emission spectrum of the build composition or 3D-part under analysis to remove peaks associated with the thermoplastic polymer of the build material prior to making any comparison. Once the emission spectrum of the build material or 3D-part under analysis is resolved, a comparison can be made between the resolved spectrum and the reference spectrum to determine authenticity.

In some examples, the reference spectrum may consist or comprise the emission spectra of each of the photoluminescent agents in the build material or 3-D printed part in their respective amounts. The emission spectrum of the build composition or 3D-part under analysis may be resolved to remove peaks associated with the thermoplastic polymer of the build material. In some examples, the emission spectrum of the build composition or 3D-part under analysis may be resolved in a selected wavelength range to remove peaks associated with the thermoplastic polymer of the build material. A comparison between the resolved spectrum and the individual emission spectra may then be made to determine authenticity.

Printing System

The build material of the present disclosure may be used to print a 3-D printed part. The 3-D printed part may be printed using a printed system, for example, a printing system 100 shown in FIG. 1. The system may include a powder bed 110 including build material in the form of, for example, a thermoplastic polymer powder 115. In the example shown, the powder bed has a moveable floor 120 that allows the powder bed to be lowered after each layer of the 3-dimensional part is printed. The 3-dimensional printed part can include a doped layer 126, including a doped portion 125, applied to a surface of a part body 127. The system also includes an inkjet printer 130 that includes a first inkjet pen 135 in communication with a reservoir of a coloured inkjet ink 140. The first inkjet pen can print the coloured ink onto the powder bed. A second inkjet pen 145 is in communication with a reservoir of a fusing ink 150. The second inkjet pen can print the fusing ink onto the powder bed. After the fusing ink has been printed onto the powder bed, a fusing lamp 160 can be used to expose the powder bed to electromagnetic radiation sufficient to fuse the powder that has been printed with the fusing inks.

Figure 1:
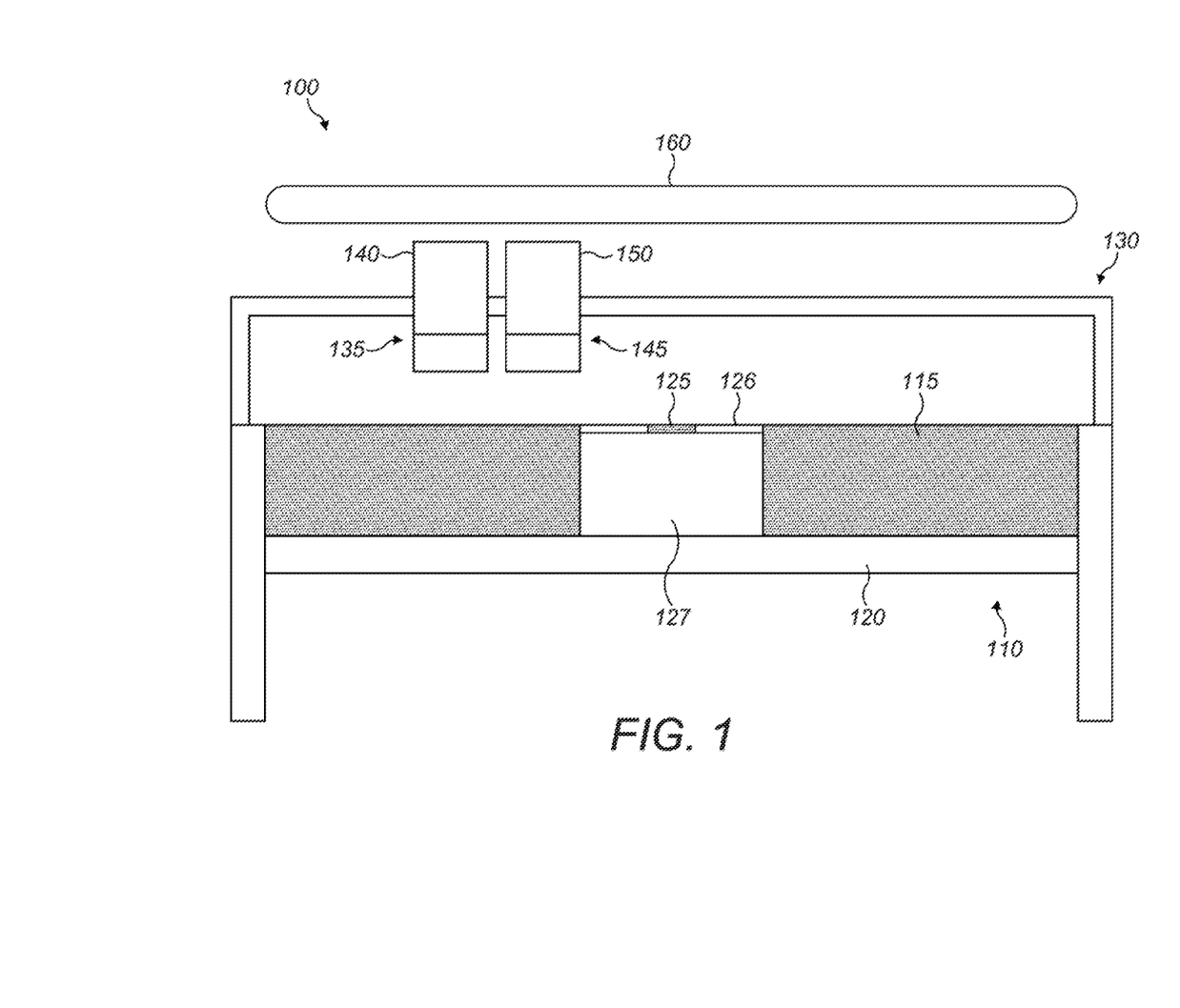
FIG. 1 is a schematic diagram of an example of a printing system that may be used to perform an example 3-D printing process.

To achieve good selectivity between the fused and unfused portions of the powder bed, the fusing inks can absorb enough energy to boost the temperature of the e.g. thermoplastic polymer powder above the melting or softening point of the polymer, while unprinted portions of the powder bed remain below the melting or softening point. In some examples, the 3-dimensional printing system can include preheaters for preheating the thermoplastic polymer powder to a temperature near the melting or softening point. In one example, the system can include a print bed heater to heat the print bed during printing. The preheat temperature used can depend on the type of thermoplastic polymer used. In some examples, the print bed heater can heat the print bed to a temperature from 130° C. to 160° C. The system can also include a supply bed, where polymer particles can be stored before being spread in a layer onto the print bed. The supply bed can have a supply bed heater. In some examples, the supply bed heater can heat the supply bed to a temperature from 90° C. to 140° C.

Suitable fusing lamps for use in the 3-dimensional printing system can include commercially available infrared lamps and halogen lamps. The fusing lamp can be a stationary lamp or a moving lamp. For example, the lamp can be mounted on a track to move horizontally across the powder bed. Such a fusing lamp can make multiple passes over the bed depending on the amount of exposure needed to coalesce each printed layer. The fusing lamp can irradiate the entire powder bed with a substantially uniform amount of energy. This can selectively coalesce the printed portions with fusing inks leaving the unprinted portions of the polymer powder below the melting or softening point.

In one example, the fusing lamp can be matched with the fusing agents in the fusing inks so that the fusing lamp emits wavelengths of light that match the peak absorption wavelengths of the fusing agents. A fusing agent with a narrow peak at a particular near-infrared wavelength can be used with a fusing lamp that emits a narrow range of wavelengths at approximately the peak wavelength of the fusing agent. Similarly, a fusing agent that absorbs a broad range of near-infrared wavelengths can be used with a fusing lamp that emits a broad range of wavelengths. Matching the fusing agent and the fusing lamp in this way can increase the efficiency of coalescing the polymer particles with the fusing agent printed thereon, while the unprinted polymer particles do not absorb as much light and remain at a lower temperature.

Depending on the amount of fusing agent present, the absorbance of the fusing agent, the preheat temperature, and the melting or softening point of the polymer, an appropriate amount of irradiation can be supplied from the fusing lamp. In some examples, the fusing lamp can irradiate each layer from about 0.5 to about 10 seconds per pass.

Example 1

A build composition was formed by mixing thermoplastic polymer particles formed of nylon-12 (PA-12) with green-emitting photoluminescent pigment particles, Risk Reactor® PF-01 (available from Risk Reactor Inc., Santa Ana, Calif., USA). The concentration of photoluminescent pigment in the mixture was 10 weight %.

A second build composition was formed by mixing thermoplastic polymer particles formed of nylon-12 (PA-12) with orange-emitting photoluminescent pigment particles, Risk Reactor® PF-03 (available from Risk Reactor Inc., Santa Ana, Calif., USA). The concentration of photoluminescent pigment in the mixture was 10 weight %.

Figure 2:
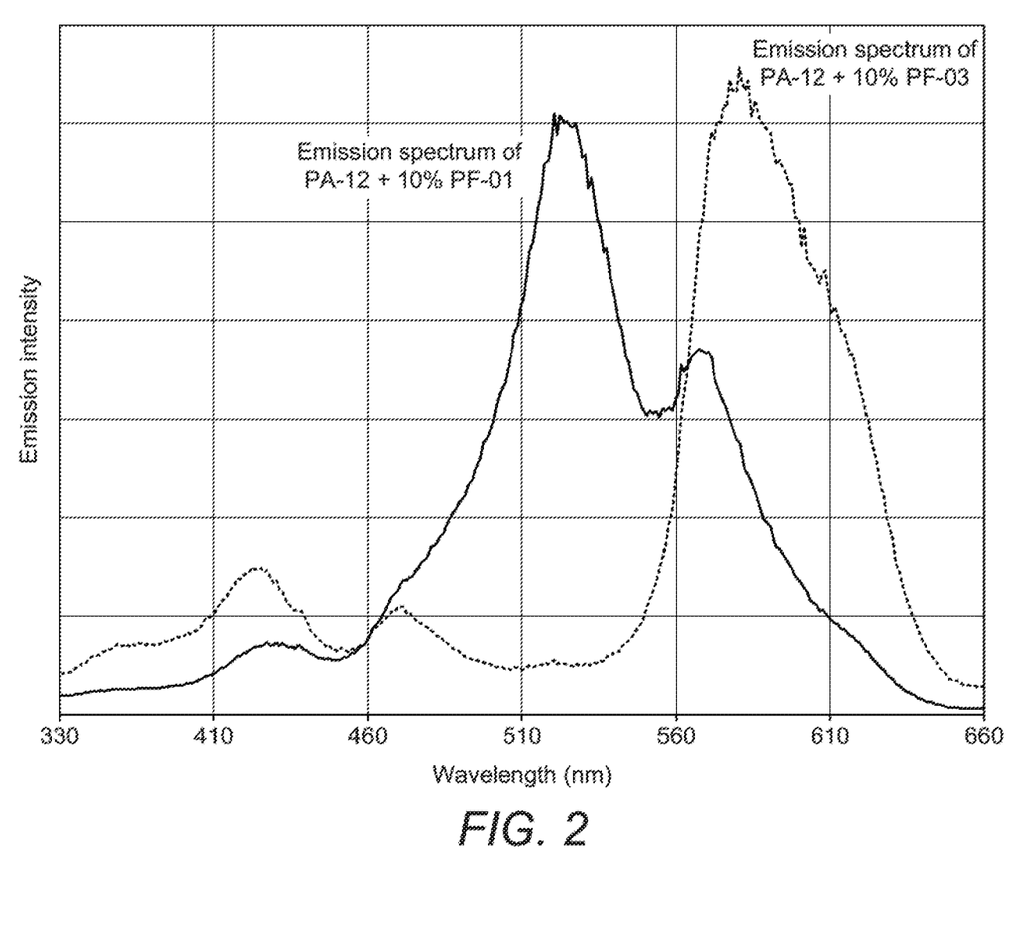
FIG. 2 show emission spectra of build compositions of Example 1.

FIG. 2 shows the emission spectra of the two build compositions with peaks attributed to the polymer PA-12 removed. The emission spectra were produced using a QM4-2006 spectrofluorometer (Photon Technology® International) at 341 nm excitation. It can be seen that PF-01 emits at a peak wavelength of 524.4 nm, while PF-03 emits at a peak wavelength of 576.9 nm.

Example 2

Three build compositions, A, B and C, were produced using a combination of green-emitting photoluminescent pigment particles, Risk Reactor® PF-01 (available from Risk Reactor Inc., Santa Ana, Calif., USA), and orange-emitting photoluminescent pigment particles, Risk Reactor® PF-03 (available from Risk Reactor Inc., Santa Ana, Calif., USA).

In build composition A, the concentration of Risk Reactor 9 PF-01 and Risk Reactor® PF-03 were 0.4 weight % and 0.8 weight %, respectively, based on the total weight of the build composition.

In build composition B, the concentration of Risk Reactor® PF-01 and Risk Reactor® PF-03 were 0.1 weight % and 1.0 weight %, respectively, based on the total weight of the build composition.

In build composition C, the concentration of Risk Reactor® PF-01 and Risk Reactor® PF-03 were 0.1 weight % and 1.0 weight %, respectively, based on the total weight of the build composition.

Figure 3A:
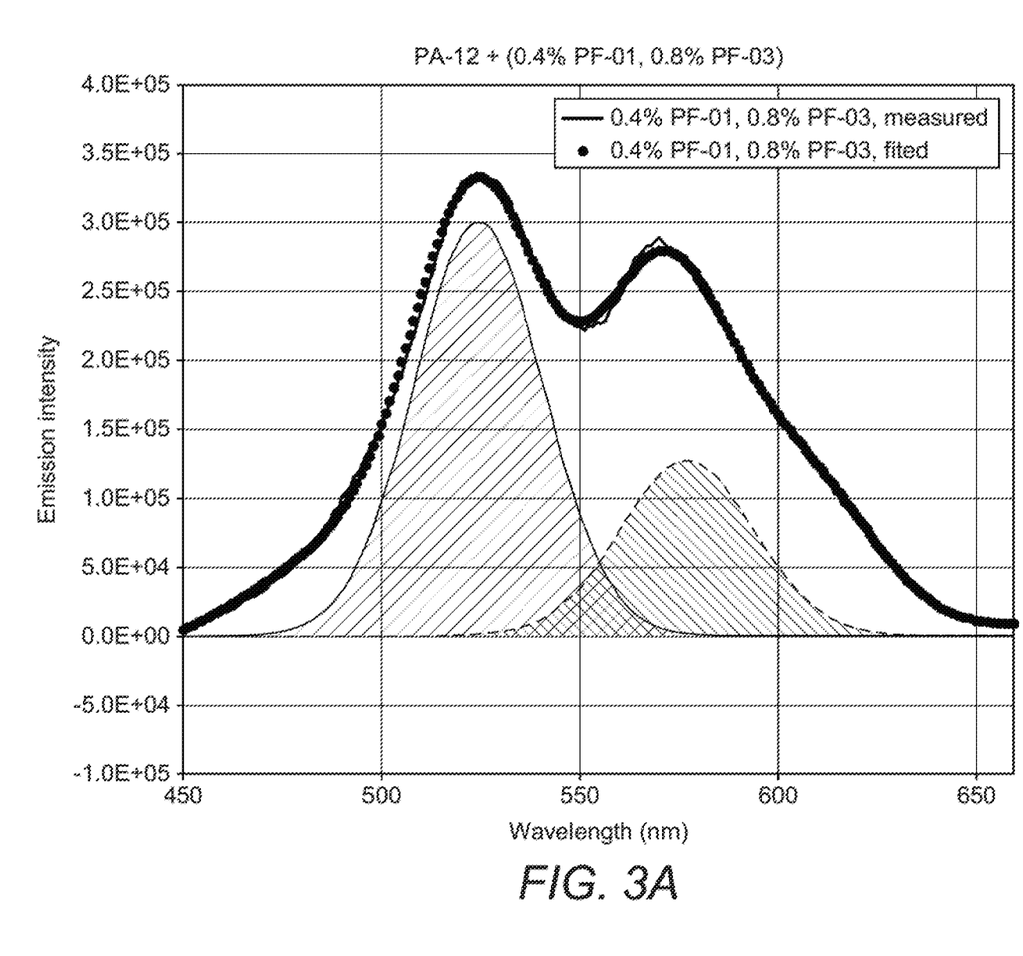
FIGS. 3a to 3c show emission spectra of build compositions A, B and C of Example 2.
Figure 3B:
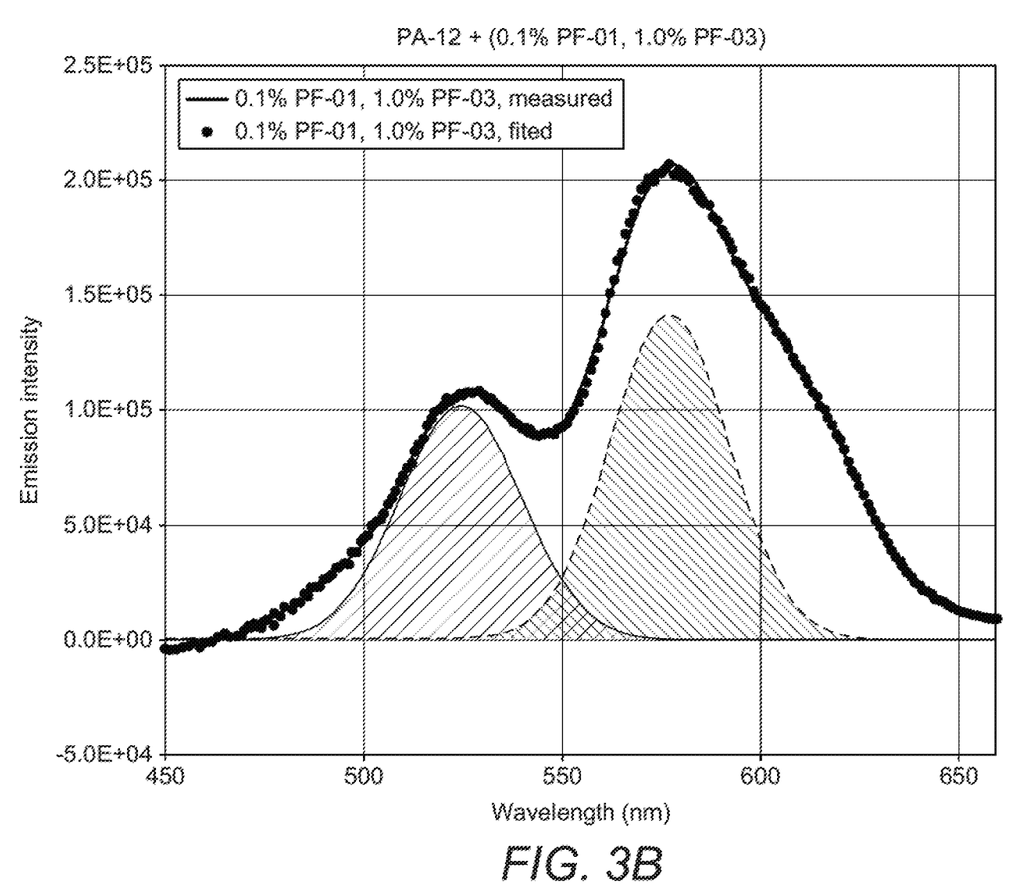
Figure 3C:
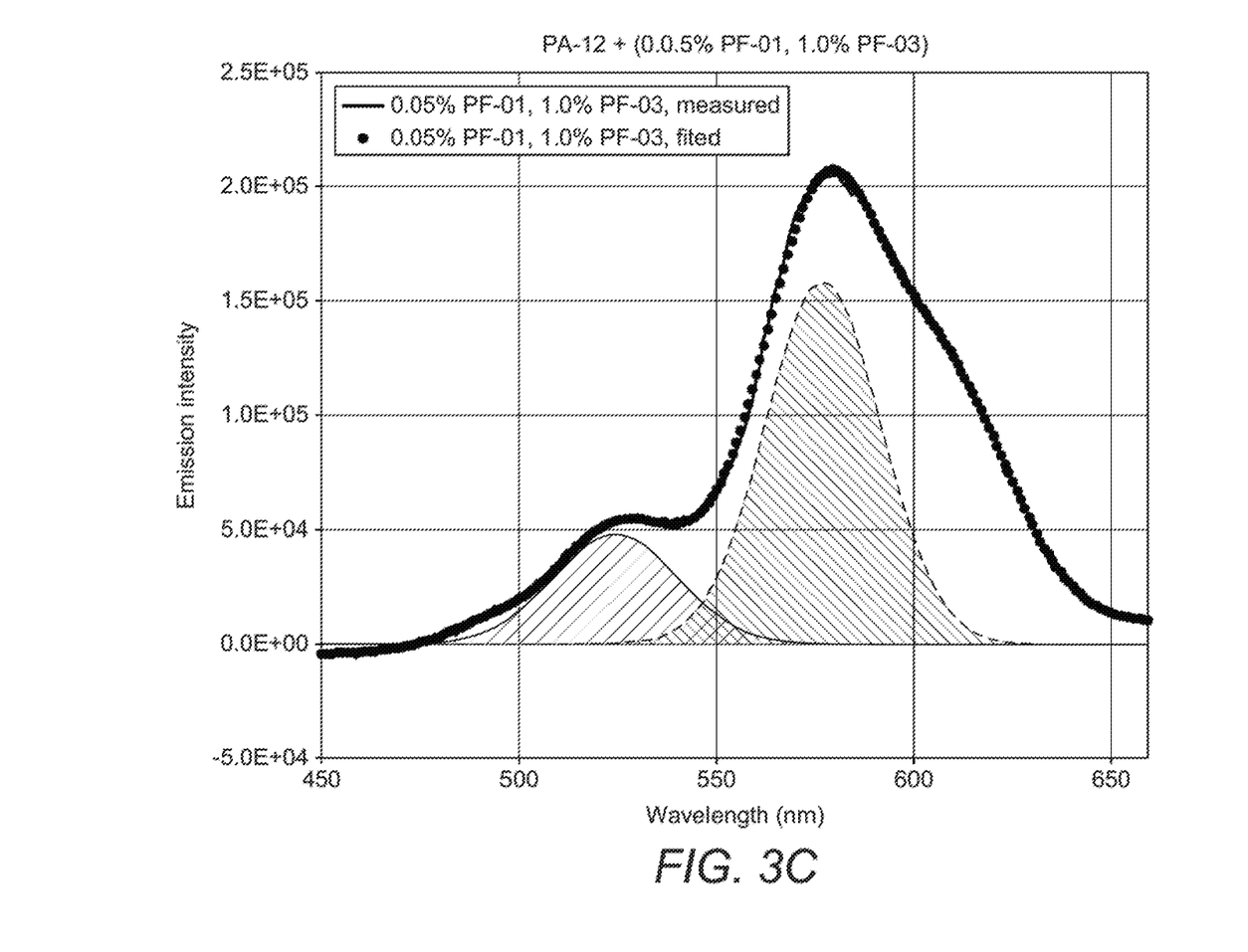

FIGS. 3A, 3B and 3C show the emission spectra of compositions A, B and C respectively. It can be seen that, by using multiple photoluminescent pigments and varying their relative amounts, different emission spectra can be produced. The relative intensities of the emission peaks correspond directly to the relative concentrations of the photoluminescent pigments.

The shaded peaks in each of FIGS. 3A to 3C correspond to peak emissions from Risk Reactor® PF-01 and Risk Reactor® PF-03, respectively, in their respective amounts. These peaks can be resolved from the emission spectra of the build compositions using peak finding software (Peak Fit by SysStat Software) and can be used as a spectral key. An emission spectrum of an unknown build composition may be analysed for known spectral keys to determine its authenticity.

Example 3

Figure 4A:
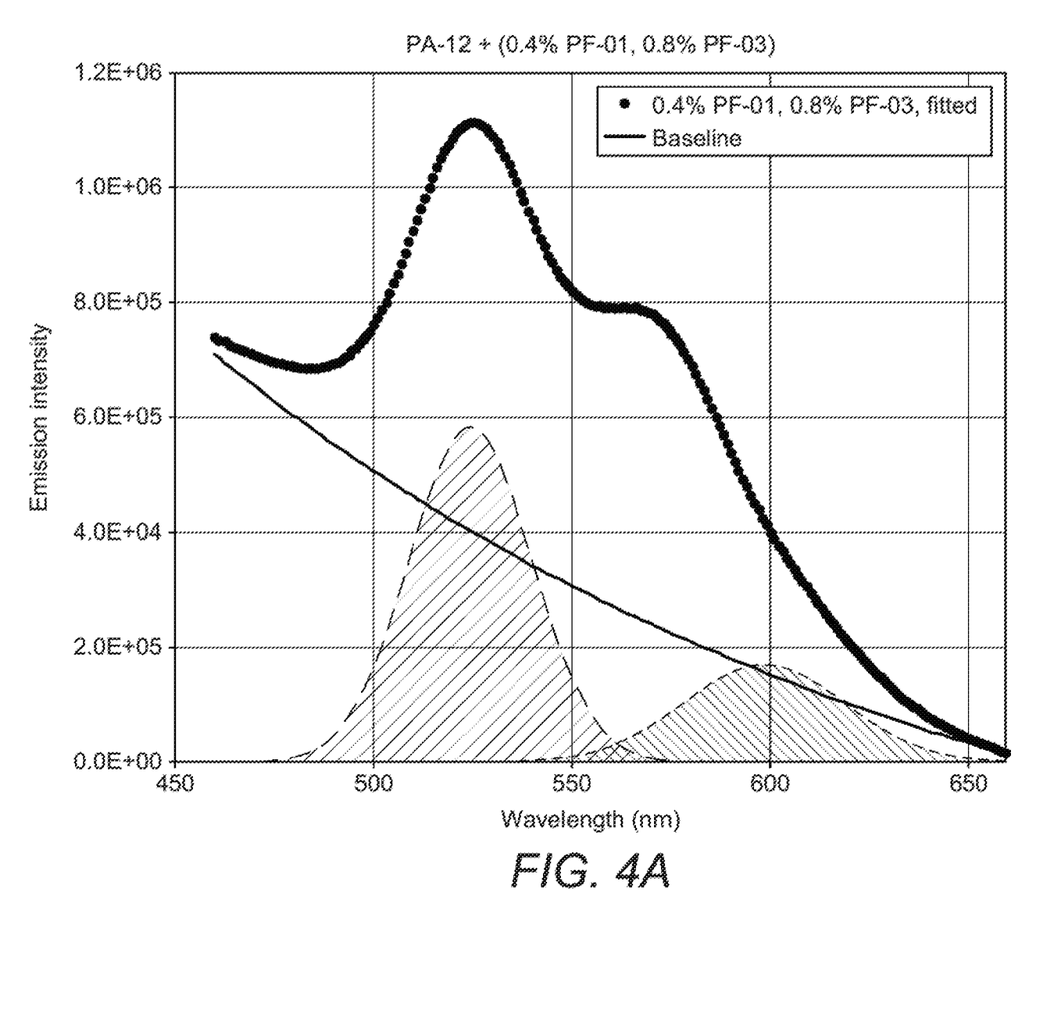
FIGS. 4a to 4c show emission spectra of coupons printed using build compositions A, B and C of Example 2.
Figure 4B:
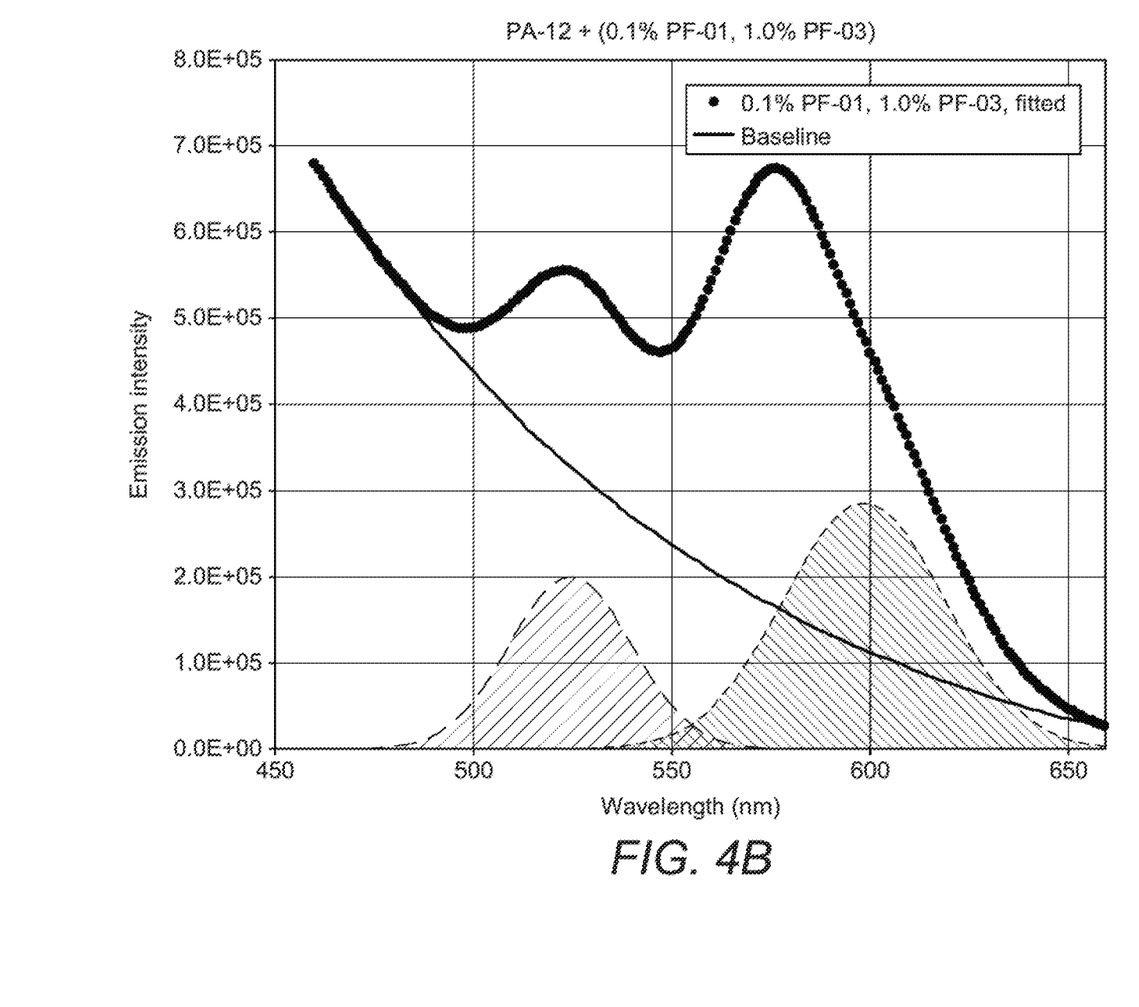
Figure 4C:
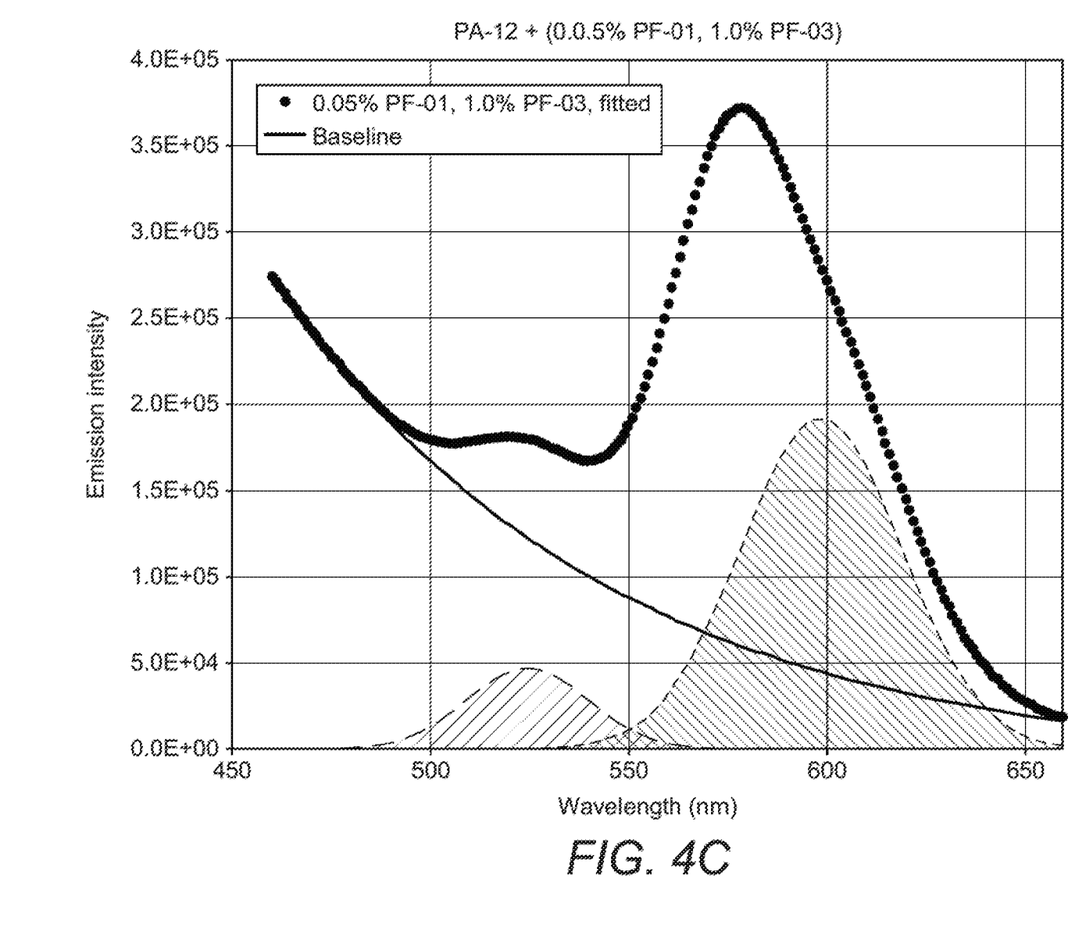

Coupons were 3-D printed using the build compositions, A, B and C. of Example 2. FIGS. 4A-4C show the emission spectra of coupons printed using compositions A, B and C respectively. As can be seen from these Figures, the peak emissions from the Risk Reactor® PF-01 and Risk Reactor (® PF-03, respectively, in their respective amounts can be found using peak finding software in the same manner as they can for the build compositions of Example 2. Thus, emission spectra of unknown printed parts can be analysed for known spectral keys to determine whether the parts were printed using build compositions from an authentic source.

The invention claimed is:

1. A build composition for a 3-dimensional printing process, the build composition comprising thermoplastic polymer particles, solid particles of a first photoluminescent agent and solid particles of a second photoluminescent agent, wherein the build composition has a spectral signature characteristic of the presence of the first photoluminescent agent and the second photoluminescent agent in combination, wherein the thermoplastic polymer particles are in the form of a powder, wherein the first photoluminescent agent and the second photoluminescent agent are in the form of a powder mixed with the thermoplastic polymer particles, and wherein the thermoplastic polymer particles are nylon 6 powder, nylon 9 powder, nylon 11 powder, nylon 12 powder, nylon 66 powder, nylon 612 powder, polyethylene powder, thermoplastic polyurethane powder, polypropylene powder, polyester powder, polyether ketone powder, polyacrylate powder, polystyrene powder, or a combination thereof.

2. A composition as claimed in claim 1, wherein the first photoluminescent agent and/or the second photoluminescent agent are UV fluorescent pigments.

3. A composition as claimed in claim 1, wherein the first photoluminescent agent and/or the second photoluminescent agent have a particle size of 10 μm to 100 μm.

4. A composition as claimed in claim 1, wherein the total amount of photoluminescent agent in the composition is 0.1 to 3 weight % based on the total weight of the composition.

5. A composition as claimed in claim 1, wherein the weight ratio of the first photoluminescent agent to the second photoluminescent agent is 20:1 to 1:20.

6. A composition as claimed in claim 1, wherein the emission spectrum of the first photoluminescent agent overlaps with the emission spectrum of the second photoluminescent agent at least at a wavelength of 400 nm to 700 nm.

7. A composition as claimed in claim 1, wherein the spectral signature of the build composition cannot be detected by visual inspection under visible light.

8. A composition as claimed in claim 1, wherein the first photoluminescent agent and/or the second photoluminescent agent has both fluorescent and phosphorescent properties.

9. A composition as claimed in claim 1, wherein the first photoluminescent agent and/or the second photoluminescent agent absorbs electromagnetic radiation at a wavelength less than 400 nm to generate a photoluminescent emission at least at a wavelength of from 400 nm to 700 nm.

10. A composition as claimed in claim 1, which further comprises a third photoluminescent agent, wherein the build composition has a spectral signature characteristic of the presence of the first, second and third photoluminescent agents in combination.

11. The composition as claimed in claim 1, wherein the first photoluminescent agent or the second photoluminescent agent comprises quantum dots having a particle size from 2 nm to 20 nm.

12. The composition as claimed in claim 1, wherein the first photoluminescent agent is a green-emitting photoluminescent pigment, and wherein the second photoluminescent agent is an orange-emitting photoluminescent pigment.

13. The composition as claimed in claim 1, wherein the first photoluminescent agent is present in an amount from 0.05 wt % to 1 wt % based on the total weight of the composition, and wherein the second photoluminescent agent is present in an amount from 0.05 wt % to 1 wt % based on the total weight of the composition.

14. The composition as claimed in claim 1, wherein the first photoluminescent agent and the second photoluminescent agent are both excited by UV light and emit visible light.

15. The composition as claimed in claim 1, wherein the thermoplastic polymer particles have an average particle size from 10 μm to 100 μm.

16. The composition as claimed in claim 1, wherein the thermoplastic polymer particles are nylon 6 powder, nylon 9 powder, nylon 11 powder, nylon 12 powder, nylon 66 powder, nylon 612 powder, or a combination thereof.

17. The composition as claimed in claim 1, wherein the thermoplastic polymer particles are blended with a filler.

* * * * *